United States Patent [19]
Melvin et al.

[11] Patent Number: 6,067,619
[45] Date of Patent: May 23, 2000

[54] APPARATUS AND METHOD FOR CONFIGURING A COMPUTER NETWORKING DEVICE

[75] Inventors: Bruce W. Melvin; Bharat K. Singh, both of Roseville, Calif.

[73] Assignee: Hewlett-Packard Company, Palo Alto, Calif.

[21] Appl. No.: 09/160,467

[22] Filed: Sep. 24, 1998

[51] Int. Cl.[7] .......................... G06F 9/445; G06F 15/177
[52] U.S. Cl. ............................ 713/100; 709/220
[58] Field of Search ..................... 713/1, 100; 709/220, 709/221, 249

[56] References Cited

U.S. PATENT DOCUMENTS

| | | | |
|---|---|---|---|
| 5,742,587 | 4/1998 | Zornig et al. | 370/235 |
| 5,777,996 | 7/1998 | Chan et al. | 370/402 |
| 5,990,577 | 11/1999 | Kamioka et al. | 307/26 |
| 5,991,885 | 11/1999 | Chang et al. | 713/300 |
| 5,999,179 | 12/1999 | Kekic et al. | 345/349 |

*Primary Examiner*—Joseph E. Palys
*Assistant Examiner*—Earl Gunderson

[57] ABSTRACT

A configuration apparatus for network devices. A plurality of LEDS on the front panel of a network device has a primary mode, displaying device and port status. These LEDS are grouped in a matrix, consisting of pairs of LEDS arranged in a plurality of parallel columns. Textual information may be provided adjacent each of the pairs, to describe an associated secondary mode, for configuration of the features and operational states of the device. When a configuration switch and mode control circuitry are enabled, drivers for the LEDS are disconnected from the ports. A configuration cycle is initiated, during which at least some of the LEDS provide visual cues to the user for carrying out the configuration operations. Sequential and unison blinking of the LEDS, as a group, individually, and in pairs, confirms reconfiguration opportunity, selection, and execution, for each secondary function.

19 Claims, 3 Drawing Sheets

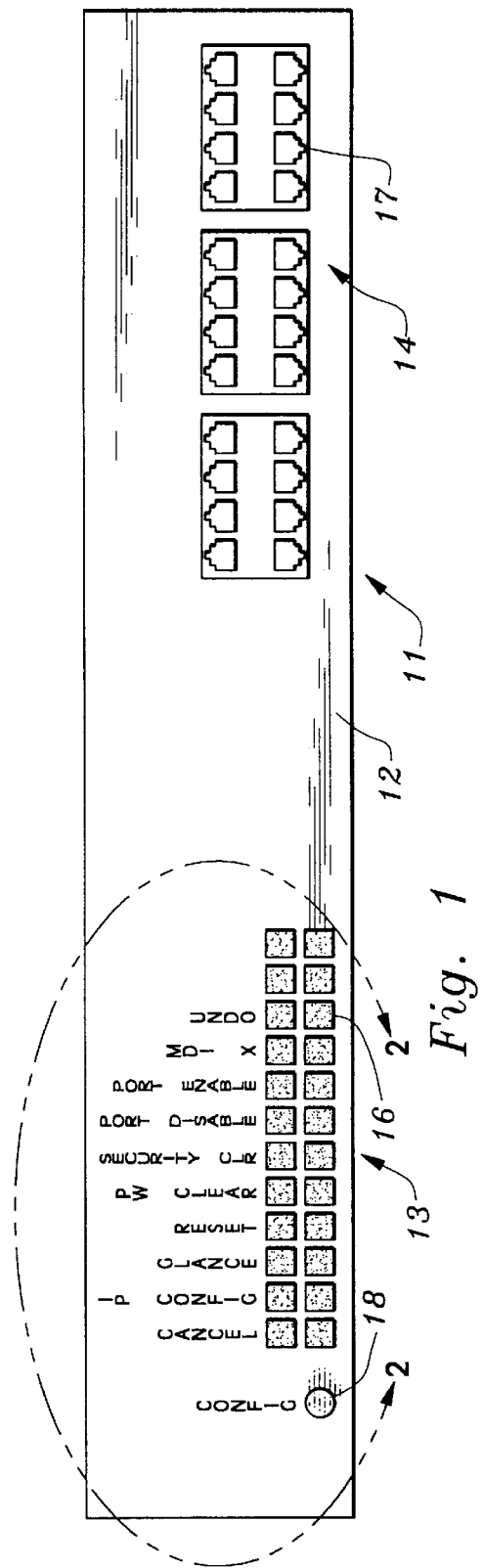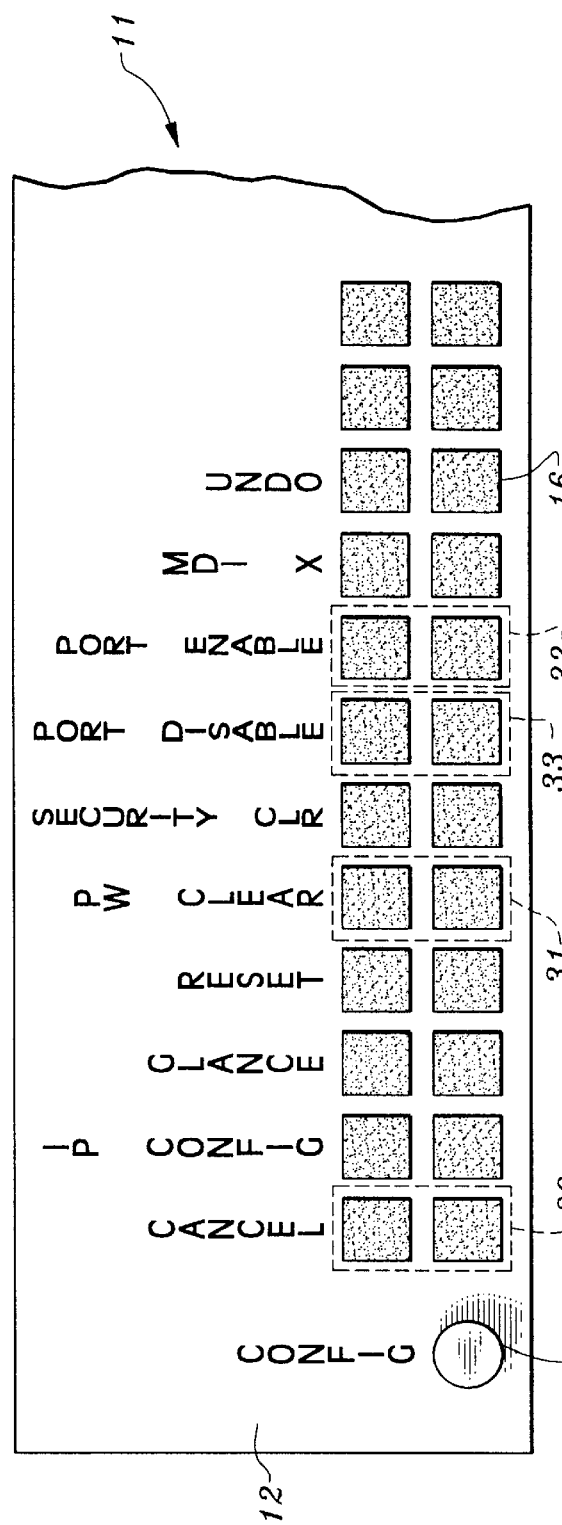

APPARATUS AND METHOD FOR CONFIGURING A COMPUTER NETWORKING DEVICE

BACKGROUND OF THE INVENTION

1. Field of the Invention

The invention relates generally to an apparatus and a method for configuring computer networking devices, such as repeaters, routers, and switches. More particularly, the invention pertains to an inexpensive modification of such network devices, enabling existing operational status light emitting diodes (LEDS), to perform a configuration function, during a secondary mode of operation, through the use of a panel-mounted configuration switch and an internal mode controller.

2. Description of Prior Art

Computer networking devices typically include LEDS to convey basic information about the operational state of the device. This information embraces, for example, global, per port activity, per port or global collision, and per port link status. Owing to the fact that these networking devices have many ports, large numbers of LEDS are usually grouped in a common area on the face panel of the device. These LEDS may also be positioned over or adjacent, the port with which they are associated. They are also typically arranged in a configuration which resembles that of the group of ports, to facilitate a visual association between the LED actuation and the respective port activity.

Prior to initial use and thereafter, network devices must be configured to tailor their operation to the users needs. For example, the user may desire to enable or disable a given port, clear a previously entered security password, or select a different mode of device operation. One way such configuration operations were previously undertaken, was through the use of a separate, dedicated console port, interconnected to a standard computer terminal or a stand-alone computer. The prior art also teaches the use of a remote network station to access the network device through any of its ports, and perform configuration operations.

However, the use of separate computers or network stations may not be practical for field operations, or other circumstances where this external equipment is not readily available. Moreover, it is desirable to eliminate the additional cost of such external equipment, if the simple configuration procedures contemplated herein could be accomplished otherwise.

Not all prior art configuration systems have relied upon external devices. For example, prior art teaches the use of recessed reset buttons on the front panels of network devices. However, only the device reset function could be performed by the user. The prior art also includes network devices having alpha-numeric displays on their front panels. A user accessible button or switch initiates a configuration mode, and a configuration operation is shown on the display. The user may parse sequentially through different "screens", to select and perform a configuration operation. While this arrangement is convenient, it adds considerable cost and complexity to the network device.

SUMMARY OF THE INVENTION

The present invention comprises a self-contained modification to an existing network device. The features of the invention allow simple configuration operations to be performed, without reliance upon external computers or controllers, or expensive alpha-numeric displays on the panel of the network device.

During a primary mode of operation, a plurality of port LEDS on the front panel of the network device displays device and port status. These LEDS are typically grouped in a matrix, consisting of pairs of LEDS arranged in a plurality of parallel, vertical columns. Textual information may be provided adjacent each of the columns, to describe an associated secondary configuration function. These functions may include changing modes of operation, clearing a security violation, clearing a password, or enabling or disabling a particular connection/communication port.

During a secondary mode of operation, the port LEDS are used to assist in the selection and execution of a configuration function. The secondary mode is enabled by means of a panel-mounted configuration button and an internal mode controller. A function selection timer and control software effect various blinking patterns for at least some of the LEDS. These visual cues for the user confirm reconfiguration opportunity, selection, and execution, for each of the available configuration functions. After a selected configuration operation has been completed, the mode controller automatically restores the primary mode, and the LEDS resume the display of port activity.

BRIEF DESCRIPTION OF THE DRAWINGS

FIG. 1 is a front elevational view of a control panel for a computer network device, showing the array of LEDS and connection ports;

FIG. 2 is a detail view of the LED array, showing to an expanded scale, the area surrounded by the semi-circular broken line 2—2 indicated in FIG. 1;

DETAILED DESCRIPTION OF THE PREFERRED EMBODIMENT

Turning now to FIG. 1 of the drawings, a network device 11 includes a front control panel 12. A plurality of port Light Emitting Diodes 13 ("LEDS") is located at one end of the panel 12. The LEDS 13 are arranged in a matrix comprised of twelve parallel and vertical columns of LEDS, each column containing a pair of LEDS. At the other end of the panel are twenty-four connection ports 14, similarly configured. Any convenient arrangement for the LEDS 13 and the ports 14 may be used, but maintaining the same pattern of physical arrangement for the LEDS and ports facilitates a visual correlation between them, without reliance upon secondary numerical identifiers.

The current practice is to wire each of the LEDS 13 to indicate communication activity at a respective port. Thus, blinking of an individual LED 16 would indicate the operational status of a respective port 17. Depending upon how the network device is configured, flashing of LED 16 may indicate either normal operation or malfunction of port 17. Displaying the activity and status of the ports will be termed herein a primary mode of operation for the LEDS 13.

Figure 4:
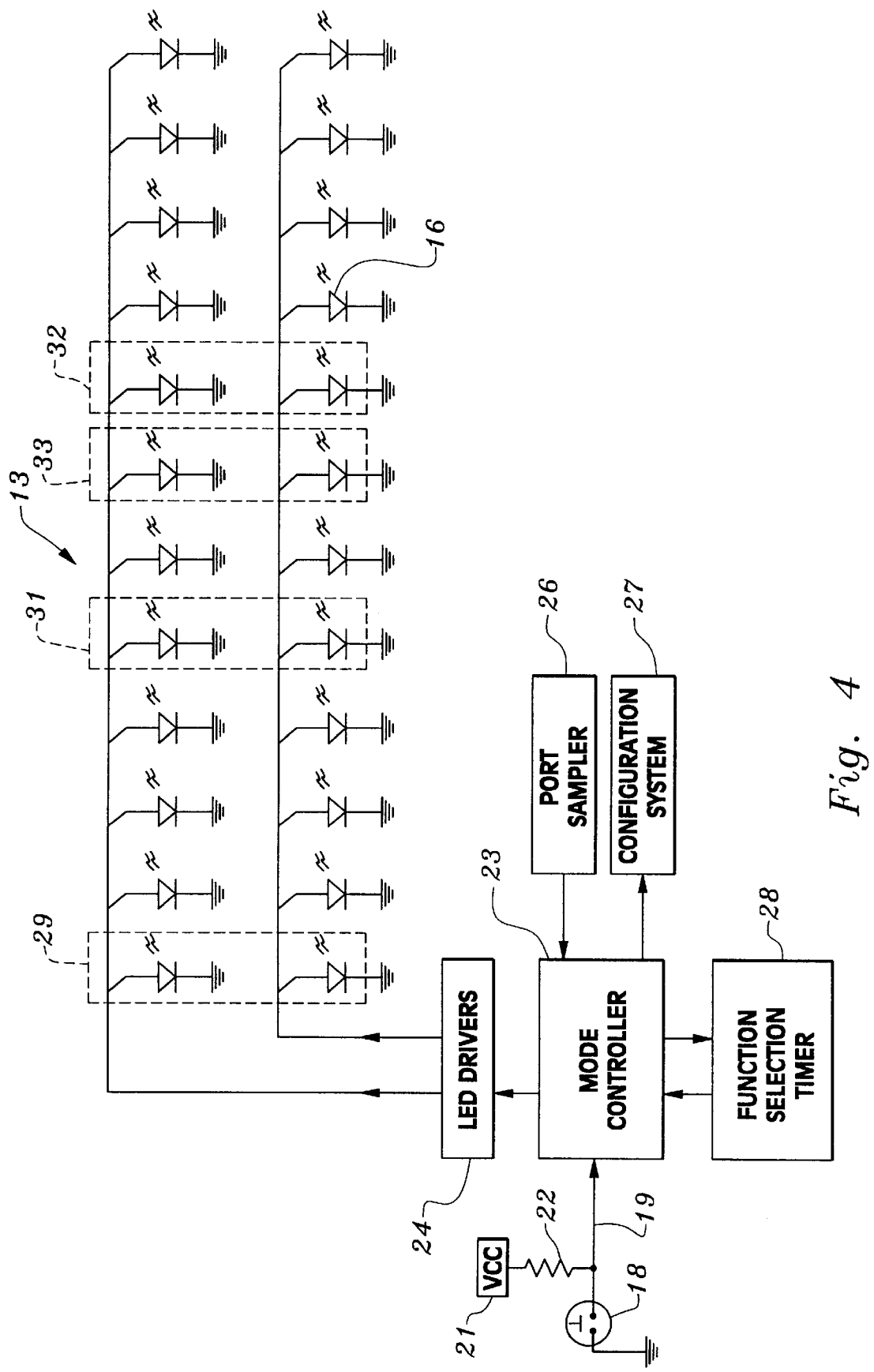

Adjacent the right end of the LED matrix is a panel-mounted configuration switch 18. As shown in FIG. 4, switch 18 is wired across a power supply line 19, to ground. Power supply 21 provides VCC to line 19, through current limiting resistor 22. Line 19 is connected to a mode controller 23, with the result that when switch 18 is depressed, the voltage at the input of controller 23 drops. Switch 18 may either be a toggle switch or a normally open button switch, depending upon the design choice for overall operation of the configuration system.

Mode controller 23 has an output line directed to LED drivers 24, an input line responsive to a port status sampler 26, an output line directed to a device configuration system 27, and input and output lines interconnected to function selection timer 28. Mode controller 23 also includes a software driven microprocessor, which allows the particular operations of the present invention to be implemented in a variety of ways. Examples of these operations will be discussed in more detail herein.

In a primary mode of operation, the multiple port outputs of port status sampler 26 are routed to LED drivers 24. The LED drivers increase the output signals of sampler 26 to a sufficient level to illuminate LEDS 13. In this manner, each of the LEDS displays the communication activity occurring at a respective connection port. It should be noted that some network devices are configured so that the port LEDS display only failure conditions or communication problems at a connection port, rather than communication activity. In this instance, during the primary mode of operation, the LEDS would only illuminate when a respective port had failed.

To enable a secondary mode, during which network device configuration operations may be performed, configuration switch 18 is actuated. In one scheme of operation, switch 18 may either be continuously depressed or switched "on", during the secondary mode enablement, configuration function selection, and configuration execution steps. In another scheme of operation, the switch 18 may be actuated a number of times to implement enablement, selection, and execution steps. This is purely a matter of design choice, and either scheme, or additional schemes, may be implemented by the software directing the operation of mode controller 23.

Assuming that switch 18 is a normally open, spring loaded button switch depression of the switch initiates a number of operations within the mode controller. First, the outputs of port status sampler 26 are disconnected from LED drivers 24. This interrupts or disables the primary mode display function of the LEDS 13, and enables a secondary mode. The software then directs mode controller 23 to send a secondary mode confirmation signal to all inputs of LED drivers 24. This will cause the entire matrix of LEDS to light momentarily, and then turn off, confirming to the user that the secondary mode configuration function has begun.

The software then triggers function selection timer 28. Timer 28 has a repetitive output pulse which is sequentially routed through mode controller 23 to the inputs of LED drivers 24. In a preferred manner of operation, a first, leftmost column of LEDS 29, comprised of a pair of LEDS, will light momentarily for a predetermined period of time, and then turn off when timer 28 times out. This period of time is entirely arbitrary, but two seconds or so should be sufficient to allow the user to effect the selection step described below. While illuminating a column pair of LEDS is preferred, illuminating only a single LED in a column or other arrangement of LEDS is entirely satisfactory, as long as the user can identify that LED with a particular configuration operation.

Timer 28 is triggered again, and the righthand adjacent LED column lights momentarily, and then turns off. This LED illumination pattern will continue until each column pair has been lit. The software can be programmed to repeat the illumination pattern as many times as desired, before exiting automatically to the primary mode.

During the course of this illumination pattern, the user is provided, of course, with visual cues for selecting and then executing a desired configuration operation. Examples of such configuration operations are as follows:

Cancel—Disables secondary mode and enables primary mode;

IP Configure—Configure the internet protocol for the device;

Glance—Configure the LEDS so they illuminate either to show port activity or port failure;

Reset—Effect a reset of the network device;

PW Clear—Clear a previously entered security password;

Security Clear—Clear a violation of the device's security protection;

Port Disable—Disable a particular communication port from further operation;

Port Enable—Enable a particular communication port to operate;

MDI-X—Cross-Over Of Media Dependent Interface;

Undo—Undo the previously executed configuration operation;

FIGS. 1 and 2 show each of these configuration operations adjacent a respective LED column. The two unmarked columns to the extreme right are reserved for new configuration operations to be implemented as the need arises.

As the columns of LEDS are sequentially actuated, the particular column corresponding to the adjacent configuration operation identification will be reached. For example, if it were desired to clear the security password stored in the network device, the user would wait until password clear column 31 ("PW Clear") were illuminated. The configuration switch 18, which has been depressed continuously since the secondary mode was enable, is now released. When the configuration switch is released, the mode controller 23 outputs an appropriate control signal to the configuration system 27 of the device, and the password is cleared.

It may be desirable to provide a visual confirmation that the desired reconfiguration has been executed. For that purpose, the software in mode controller 23 may be programmed to effect a rapid and repeated flashing of the LEDS in column 31 for several seconds. Immediately thereafter, the secondary mode is disabled and the primary mode is enabled. Thus, the normal display function of the LEDS automatically resumes, after a single configuration operation has been performed. Alternatively, the secondary mode may continue, until the current configuration cycle is complete, after all columns of LEDS have been sequentially illuminated.

A special class of configuration operation exists for enabling or disabling connection ports, or similar multi-faceted operations having greater complexity than a simple toggle procedure. For such operations, the user must first select the appropriate LED column.

In this case, if the user desires to enable a connection port, the user waits until a port enable column 32 is illuminated. Releasing configuration switch 18 initiates a port configuration mode. In this special mode, individual LEDS throughout the entire matrix are sequentially actuated for a predetermined period of time. Thus, if port 17 is to be enabled, the user waits until LED 16 is illuminated, and then depresses switch 18. As before, a control signal is dispatched to configuration system 27, and port 17 is enabled. Following the flashing confirmation of LED 16, the network device returns automatically to the primary mode of operation. Disablement of a port is effected in a similar manner, only the user waits until port disable column 33 is illuminated before releasing the configuration button 18.

Figure 3:
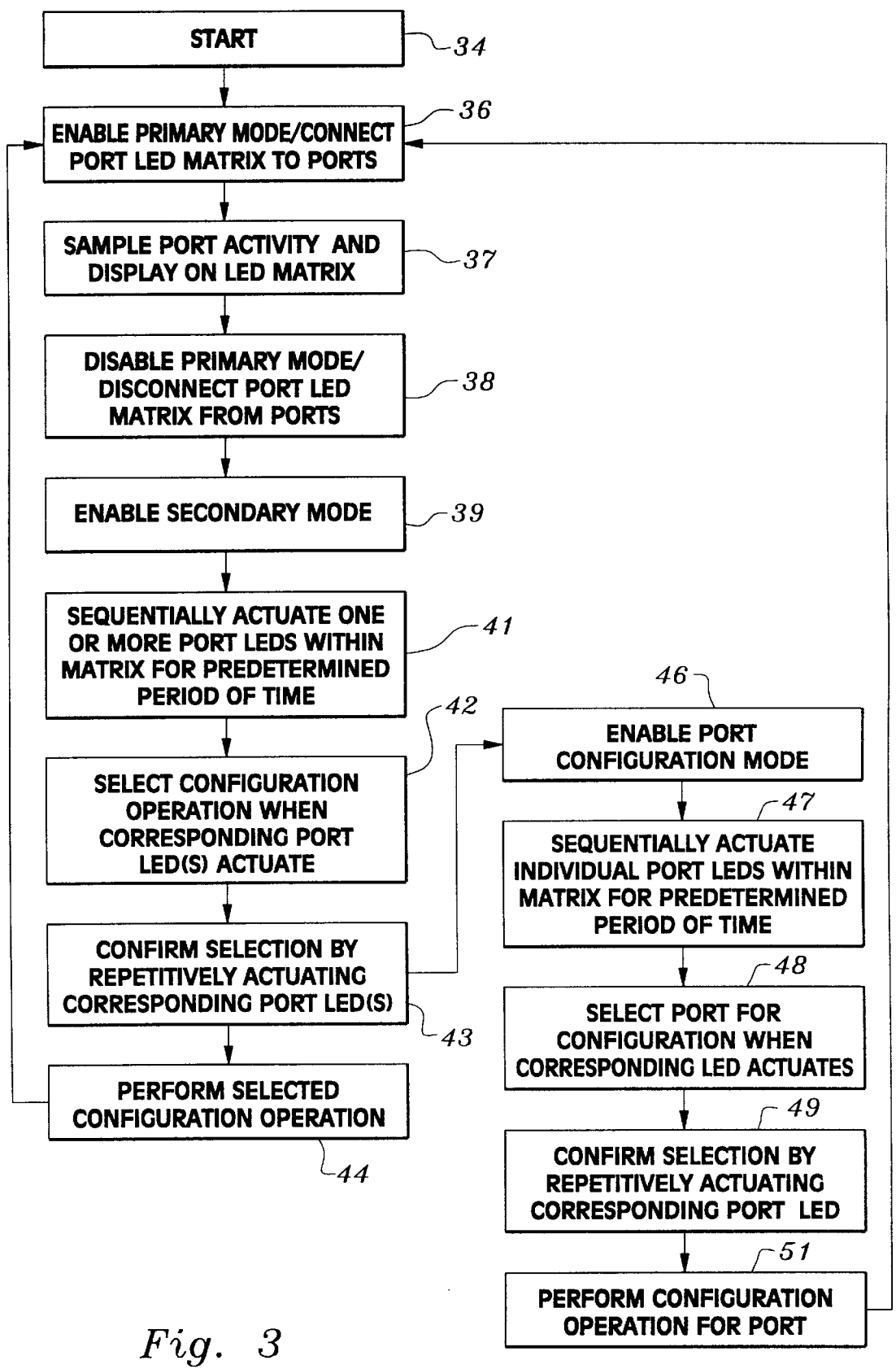
FIG. 3 is a flow chart showing the steps involved in carrying out the primary and secondary modes of operation of the network device; and, FIG. 4 is functional block diagram of selected portions of a typical network device, incorporating the additional components of the present apparatus.

The process undertaken in using the apparatus of the present invention is summarized in FIG. 3. After the start 34 of the network device, step 36 enables the primary mode, and connects the port LED matrix 13 to the ports 14. In step 37, port activity is sampled, and the activity is displayed on the LED matrix.

Undertaking step 38, the primary mode is disabled, by disconnecting the port LED matrix from the ports 14. Following, in step 39, the secondary mode is enabled. Next, in step 41, one or more port LEDS within the matrix are sequentially actuated for a predetermined period of time.

A configuration operation is selected when the corresponding port LED(S) actuates, in step 42. In an optional step 43, selection is confirmed by repetitively actuating the corresponding port LED(S). In a final step 44, the selected configuration operation is performed. Then, primary mode operation resumes when the process returns to step 36.

In the special configuration operation, the user waits until a port configuration LED (enable or disable) actuates in step 42. After selection has been confirmed in step 43, the selected port configuration mode is enabled in step 46. Individual port LEDS are sequentially actuated for a predetermined period of time, in step 47.

The user then selects the port for configuration when the corresponding LED actuates, in step 48. Next, in step 49, selection is confirmed by repetitively actuating the corresponding port LED. The configuration operation for the selected port is then performed in step 51, before the process returns to step 36, when the device resumes a primary mode of operation.

It will be appreciated, then, that we have disclosed a system for configuring network devices which is simple and effective, yet entirely self-contained within the device.

What is claimed is:

1. A computer network device having a plurality of connection ports for transmitting and receiving signals and a plurality of light emitting diodes, comprising:
   a. a configuration switch;
   b. a mode controller interconnected to said configuration switch, said ports, and said diodes, said mode controller having a primary mode during which signals sampled at said ports are routed to said diodes to display an operational status of a respective port, and a secondary mode, enabled by said configuration switch, during which at least some of said diodes are sequentially actuated for a predetermined period of time until a diode corresponding to a selected configuration function is actuated, whereafter said configuration switch is toggled and said mode controller produces a control signal; and,
   c. a network configuration system connected to said mode controller, said configuration system being responsive to said control signal and effective to perform said selected configuration function.

2. An apparatus as in claim 1 in which said configuration switch is continuously depressed during a configuration cycle until said diode corresponding to said selected configuration function is actuated.

3. An apparatus as in claim 1 in which the diodes are arranged on a front panel of the network device in a plurality of columns of two diodes, and in which said two diodes of each column are actuated together and said columns are actuated sequentially for a predetermined period of time during a configuration cycle.

4. An apparatus as in claim 3 in which each of said columns includes an identification for a secondary mode configuration function, and in which said configuration function is performed by said network configuration system if a respective column is selected during said configuration cycle.

5. An apparatus as in claim 1 including diode drivers interconnected between said mode controller and said light emitting diodes.

6. An apparatus as in claim 1 including a function selection timer connected to said mode controller, said selection timer being repeatedly actuated for said predetermined period of time during said secondary mode, and effective to actuate each of said diodes sequentially.

7. A computer network device having a plurality of ports for transmitting and receiving signals and a plurality of light emitting diodes, comprising:
   a. configuration switch means;
   b. a mode controller interconnected to said configuration switch means, said ports, and said diodes, said mode controller having a primary mode during which signals sampled at said ports are routed to said diodes to display an operational status of a respective port, and a secondary mode, enabled by said configuration switch means, during which at least some of said diodes are sequentially actuated for a predetermined period of time until a diode corresponding to a selected configuration function is actuated, whereafter said configuration switch means is toggled and said mode controller produces a control signal; and,
   c. a network configuration system connected to said mode controller, said configuration system being responsive to said control signal and effective to perform said selected configuration function.

8. An apparatus as in claim 7 in which said mode controller means is interconnected to a function selection timer.

9. An apparatus as in claim 7 in which said diodes are disconnected from said ports during said secondary mode.

10. A method for configuring a computer network device having a plurality of connection ports for transmitting and receiving signals, a plurality of port light emitting diodes, and a network configuration system, each diode's actuation corresponding alternatively to the operational status of a particular port or to the selection of a configuration function, comprising the steps of:
   a. enabling a primary mode during which each of said port diodes shows the operational status of a respective one of said ports;
   b. disabling the primary mode by disconnecting said port diodes from said ports;
   c. enabling a secondary mode during which at least some of said port diodes are sequentially actuated for a predetermined period of time until a diode corresponding to a selected configuration function is actuated;
   d. actuating the configuration system to perform the selected configuration function.

11. A method as in claim 10 further including the steps of: enabling a port configuration mode when a corresponding port configuration diode is actuated; sequentially actuating the individual port diodes for a predetermined period of time; selecting a port for configuration when a corresponding port diode actuates; and, performing a configuration operation for the selected port.

12. A method as in claim 10 further including the steps, after the selected configuration function is performed, of disabling the secondary mode and enabling the primary mode.

13. A method as in claim 10 including the step, after the secondary mode is enabled, of blinking one or more of said port diodes to provide visual confirmation that said secondary mode has been enabled.

14. A method as in claim 10 including the step, after the selected configuration function has been performed, of blinking one or more of said port diodes to provide visual confirmation that said configuration function has been performed.

15. A computer network device having a plurality of ports for transmitting and receiving signals, and a plurality of light emitting diodes, comprising:

a. a configuration switch;

b. a function selection timer having a predetermined period during which selection of a configuration function is made;

c. a mode controller interconnected to said configuration switch, said function selection timer, said ports, and said diodes, said mode controller having a primary mode in which a signal sampled at each said ports is routed to a respective one of said diodes to display an operational status of a respective port, said mode controller further having a secondary mode enabled by said configuration switch in which said function selection timer is repeatedly cycled, sequentially actuating said diodes for said predetermined period of time, whereupon a configuration function is selected by toggling said configuration switch, and a control signal is produced by said mode controller; and, e. a network configuration system connected to said mode controller and responsive to said control signal corresponding to a selected configuration function.

16. An apparatus as in claim 15 including a configuration cycle during which said diodes are actuated, and during which said configuration switch is continuously depressed until said diode corresponding to said selected configuration is actuated.

17. An apparatus as in claim 16 in which the diodes are arranged on a front panel of the network device in a plurality of columns of two diodes, and in which said two diodes of each column are actuated together and said columns are actuated sequentially during the configuration cycle.

18. An apparatus as in claim 17 in which each of said columns includes an identification for a secondary mode configuration function, and in which said configuration function is performed by said network configuration system if a respective column is selected during said configuration cycle.

19. An apparatus as in claim 15 including diode drivers interconnected between said mode controller and said diodes.

\* \* \* \* \*